US009033286B2

(12) United States Patent
Fox

(10) Patent No.: US 9,033,286 B2
(45) Date of Patent: May 19, 2015

(54) RAILWAY SNOW MELTER DUCT ASSEMBLY

(71) Applicant: Railway Equipment Company, Inc., Plymouth, MN (US)

(72) Inventor: David K. Fox, Wayzata, MN (US)

(73) Assignee: Railway Equipment Company, Inc., Boco Grande, FL (US)

( * ) Notice: Subject to any disclaimer, the term of this patent is extended or adjusted under 35 U.S.C. 154(b) by 0 days.

(21) Appl. No.: 14/034,838

(22) Filed: Sep. 24, 2013

(65) Prior Publication Data

US 2014/0239128 A1 Aug. 28, 2014

Related U.S. Application Data

(60) Continuation of application No. 13/597,008, filed on Aug. 28, 2012, now Pat. No. 8,540,193, which is a division of application No. 11/906,538, filed on Oct. 2, 2007, now Pat. No. 8,251,320.

(60) Provisional application No. 60/849,640, filed on Oct. 4, 2006.

(51) Int. Cl.
*E01B 7/00* (2006.01)
*E01B 19/00* (2006.01)

(52) U.S. Cl.
CPC ...................... *E01B 19/00* (2013.01)

(58) Field of Classification Search
USPC ........................................................ 246/428
See application file for complete search history.

(56) References Cited

U.S. PATENT DOCUMENTS

| 2,193,176 | A | * | 3/1940 | Krugler et al. | 431/343 |
|---|---|---|---|---|---|
| 2,894,704 | A | * | 7/1959 | Bone | 246/428 |
| 2,993,669 | A | * | 7/1961 | Kistler | 246/428 |
| 3,697,746 | A | * | 10/1972 | Patterson et al. | 246/428 |
| 3,972,497 | A | * | 8/1976 | Ringer | 246/428 |
| 4,081,161 | A | * | 3/1978 | Upright | 246/428 |
| 4,131,255 | A | * | 12/1978 | Menia | 246/430 |
| 4,674,718 | A | * | 6/1987 | Bjorklund | 246/428 |
| 4,683,870 | A | * | 8/1987 | Bjorklund | 126/271.1 |
| 4,695,017 | A | * | 9/1987 | Ringer et al. | 246/428 |
| 5,702,074 | A | * | 12/1997 | Paterick-Smith et al. | 246/428 |
| 6,065,721 | A | * | 5/2000 | Sumpton et al. | 246/428 |
| 2009/0277999 | A1 | * | 11/2009 | Fox | 246/449 |

OTHER PUBLICATIONS

Operating Manual, Model No. 933 Standard & Model No. 941 Low Profile, Gas Fired Hot Air Blower Track Switch Snow Melter with Steel Tie Duct, P/N R9330-0100, Rev K, Sep. 2005.

* cited by examiner

*Primary Examiner* — Jason C Smith
(74) *Attorney, Agent, or Firm* — Merchant & Gould PC

(57) ABSTRACT

The present disclosure relates to a component for a railway snow melter. The component includes a mounting plate adapted for connection to a tie duct. The mounting plate defines a point nozzle opening and/or a track duct nozzle. A point nozzle is mounted to the mounting plate at a location above the point nozzle opening. A track duct nozzle is mounted to the mounting plate at a location above the track duct nozzle opening.

3 Claims, 14 Drawing Sheets

RAILWAY SNOW MELTER DUCT ASSEMBLY

CROSS REFERENCE TO RELATED APPLICATIONS

This application is a continuation of U.S. application Ser. No. 13/597,008 filed Aug. 28, 2012, which is a divisional of U.S. application Ser. No. 11/906,538 filed Oct. 2, 2007 and issued as U.S. Pat. No. 8,251,320 on Aug. 28, 2012, which claims the benefit of U.S. Provisional Patent Application Ser. No. 60/849,640 filed Oct. 4, 2006, which applications are incorporated herein by reference in their entireties.

TECHNICAL FIELD

The present invention relates generally to railway equipment. More particularly, the present invention relates to equipment for use with hot air blowers for melting snow and ice at railway switch points or other locations.

BACKGROUND

FIG. 1 shows a prior art railway switch 10. The switch 10 includes fixed rails 22a and 24a secured to railroad ties 26. The switch layout 10 also includes switching rails 22b and 24b positioned inside the fixed rails 22a, 24a. An actuator 28 is provided for moving the switching rails 22b, 24b between a first position (shown in FIG. 1) and a second position (not shown). In the first position, the switching rail 22b contacts the fixed rail 22a and the switching rail 24b is offset from the fixed rail 24a. In the second position, the switching rail 22b is offset from the fixed rail 22a, and the switching rail 24b contacts the fixed rail 24a. The actuator 28 is linked to the switching rails 22b, 24b by a throw rod 30.

In northern climates, snow and ice can accumulate at the switch 10 and thereby interfere with the movement of the switching rails 22b, 24b between the first and second positions. To prevent the accumulation of snow and ice, a hot air blower 32 is provided for melting snow and ice at the switch 10. A duct assembly 34 carries hot air from the blower 32 to the switch 10. The duct assembly 34 includes a lateral duct 36, a tie duct 38, inner track ducts 40 and outer track ducts 42 (only one shown). The lateral duct 36 extends from the blower 32 to the tie duct 38. The tie duct 38 extends beneath the fixed rails 22a, 24a, and supports the rails 22a, 24a. The inner track ducts 40 extend generally perpendicularly outwardly from the tie duct 38. The inner track ducts 40 are positioned inside the switching rails 22b, 24b and are generally parallel to the switching rails 22b, 24b. The outer track ducts 42 also extend perpendicularly outwardly from the tie duct 38. The outer track ducts 42 are positioned outside the fixed rails 22a, 24a and are generally parallel to the fixed rails 22a, 24a. The track ducts 40, 42 are connected to the tie duct 38 by track duct nozzles 44. The track ducts 40, 42 include punch-outs (not shown) where holes can be formed for directing hot air from the track ducts 40, 42 toward selected locations of the switch 10. The duct assembly 34 can also include point nozzles 46 coupled to the tie duct 38. The point nozzles 46 function to direct hot air at the contact points between the fixed rails 22a, 24a and the switching rails 22b, 24b.

FIGS. 2 and 3 show the tie duct 38 in more detail. Generally, the tie duct 38 is a railroad tie-shaped duct constructed of a material such as metal. The tie duct 38 has a hollow, generally rectangular cross-section and has end flanges 48 for coupling either end of the tie duct 38 to the lateral duct 36. As depicted in FIGS. 2 and 3, the ends of the tie duct 38 are enclosed by end plates 39. When the tie duct 38 is installed at a railway site, at least one of the end plates 39 is removed prior to attaching the lateral duct 36 to the corresponding end flange 48 of the tie duct 38 so that fluid communication is provided between the interior of the lateral duct 36 and the interior of the tie duct 38.

Referring still to FIGS. 2 and 3, the fixed rails 22a, 24b are secured to the tie duct 38 by a conventional rail fastening arrangement. For example, as shown at FIGS. 2 and 3, the fixed rails 22a, 24a are secured to the tie duct 38 by tie plates 50 fastened to the top side of the tie duct 38, and e-clips 52 that link the tie plates 50 to the fixed rails 22a, 24a so that the rails are fixed to the top sides of the tie plates 50.

The top side of the tie duct 38 also defines openings for providing fluid communication between the hollow interior of the tie duct 38 and the inner track ducts 40, the outer track ducts 42, and the point nozzles 46. For example, openings 54 in the tie duct 38 provide fluid communication with the outer track ducts 42, openings 56 in the tie duct 38 provide fluid communication with the inner track ducts 40, and openings 58 in the tie duct 38 provide fluid communication with the point nozzles 46. When the track ducts 40, 42 or the point nozzles 46 are not installed on the tie duct 38, cover plates 60 (shown mounted over the openings 54) can be mounted over the openings 54, 56 or 58 to prevent debris from entering the interior of the tie duct 38.

Referring to FIGS. 4-6, the point nozzles 46 are fastened to the top wall of the tie duct 38 at locations over the openings 58. Preferably, the point nozzles 46 are fastened to the tie duct 38 by a fastening arrangement that electrically isolates the point nozzles 46 from the tie duct 38. As shown at FIGS. 4 and 5, the fastening arrangement includes bolts 62 that extend through curved openings 64 defined by a bottom flange 66 of the point nozzle 46. The bolts 62 are typically threaded within tapped openings 63 defined through a top wall 65 of the tie duct 38. A screen 68 is mounted at the top side of the tie duct 38. The screen 68 covers the opening 58 to prevent animals (e.g., rodents) or debris from entering the interior of the tie duct 38. A dielectric gasket 70 is mounted between the screen 68 and the bottom flange 66. The gasket 70 has a shape that generally matches the shape of the bottom flange 66 and functions to electrically isolate the flange 66 from the top side of the tie duct 38. The bolts 62 are also preferably electrically isolated from the point nozzle 46. As shown at FIG. 4, a dielectric bushing/spacer 72 isolates the shank of the bolt 62 from the bottom flange 66, and a dielectric washer 74 electrically isolates the head of the bolt 62 from the point nozzle 46. The fastening assembly also includes a flat washer 76 positioned below the dielectric washer 74, a flat washer 78 positioned above the dielectric washer 74, and a split lock washer 80 positioned between the flat washer 76 and the head of the bolt 62. It will be appreciated that four of the bolt fastening assemblies are provided for each of the point nozzles 46.

Fastening arrangements are also used to fasten the track duct nozzles 44 to the top wall of the tie duct 38. The track duct nozzles 44 corresponding to the inner track ducts 40 are mounted over the openings 56, and the track duct nozzles 44 corresponding to the outer track ducts 42 are mounted over the openings 54. Similar to the point nozzles 46, it is desirable for the track duct nozzles 44 to be electrically isolated from the tie duct 38.

Referring to FIGS. 7-9, an example fastening arrangement for securing the track duct nozzles 44 to the top wall 65 of the tie duct 38 is shown. The fastening arrangement includes a plurality of bolts 82 that are mounted through openings 84 defined through a bottom flange 86 of the track duct nozzle 44. Typically, the bolts 82 are threaded within tapped openings 67 defined through the top wall 65 of the tie duct 38. A dielectric gasket 90 having a shape that generally matches the shape of the bottom flange 86 is mounted beneath the bottom flange 86. The gasket 90 functions to electrically insulate the bottom flange 86 from the top side of the tie duct 38. A screen 88 is mounted between the gasket 90 and the top side of the tie duct 38. The screen 88 prevents animals or debris from entering the interior of the tie duct 38. The bolts 82 are also preferably electrically isolated from their corresponding track duct nozzles 44. For example, as shown at FIG. 7, a dielectric spacer/bushing 92 and a dielectric washer 94 are provided for each bolt 82. The dielectric spacers/bushings 92 isolate the shanks of the bolts 82 from the bottom flange 86, and the dielectric washers 94 electrically isolate the heads of the bolts 82 from the bottom flanges 86. The fastening assemblies also include a flat washer 98 positioned above each dielectric washer 94, and a split lock washer 100 positioned between each flat washer 98 and the head of each corresponding bolt 82. Adhesive 101 can be used to provide a seal at the interface between the track duct nozzles 44 and the track ducts 40 and 42.

SUMMARY

The present disclosure relates to systems and methods for facilitating connecting and disconnecting snow melter duct nozzles to tie ducts. Systems and methods in accordance with the principles of the present disclosure allow snow melting systems for use at railway locations to be assembled in the field more efficiently. This provides significant time savings during initial installation of the snow melter. Additionally, the invention provides substantial time savings when the snow melter duct work is disassembled to permit tamping operations, and then reassembled.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
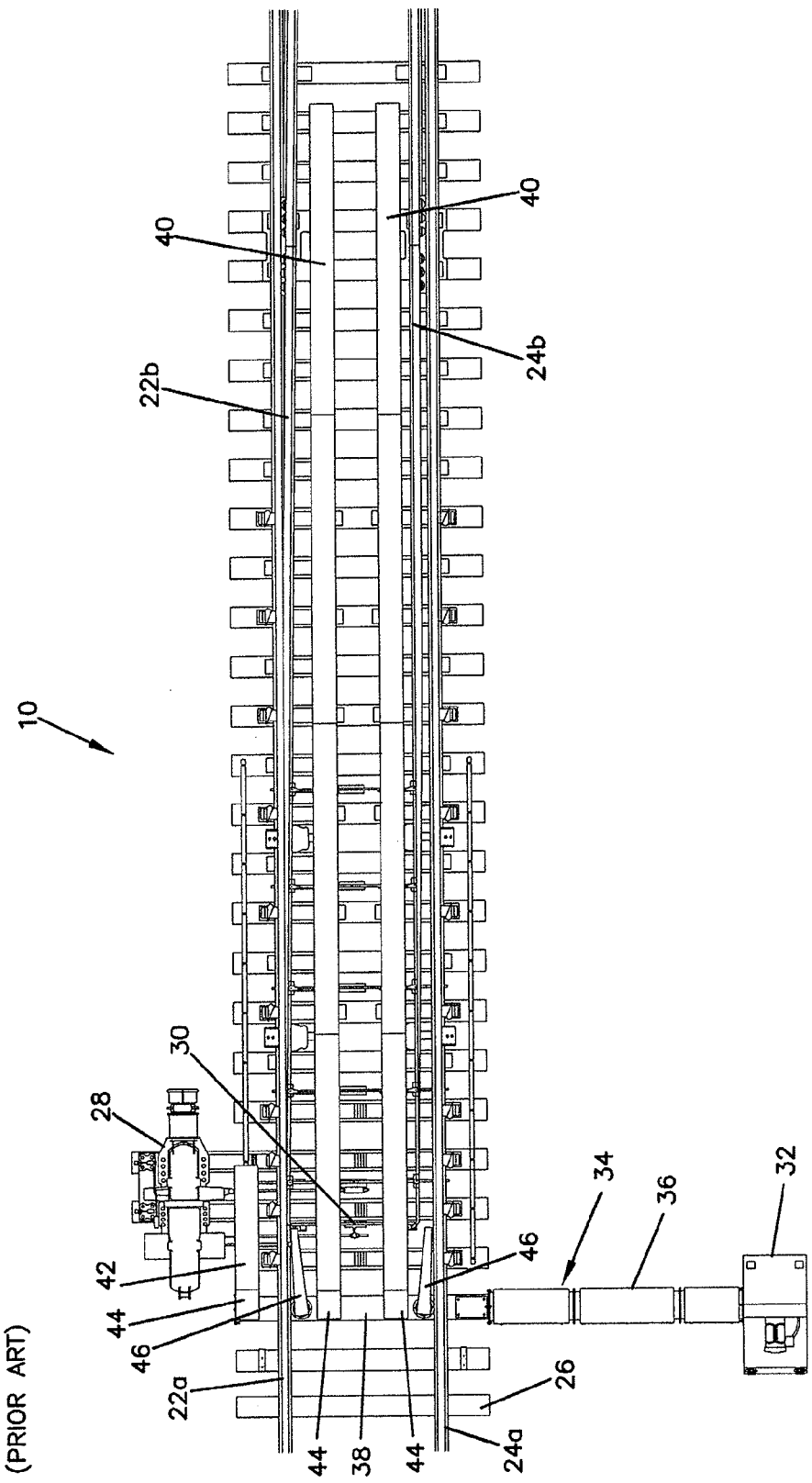
FIG. 1 is a top, plan view of a prior art railroad switch layout.
Figure 2:
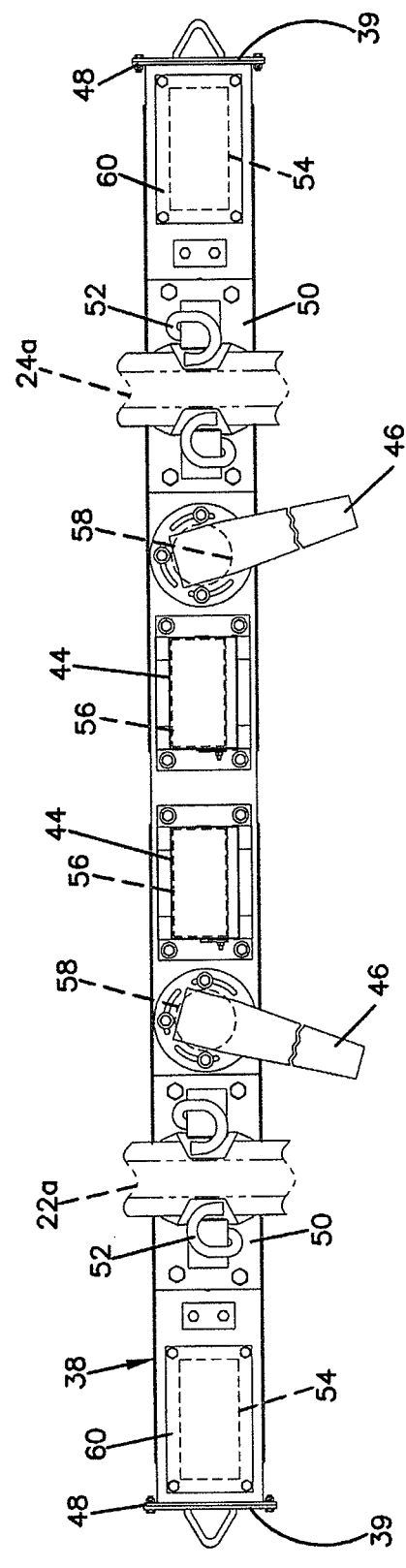
FIG. 2 is a top, plan view of a prior art tie duct used in the switch layout of FIG. 1.
Figure 3:
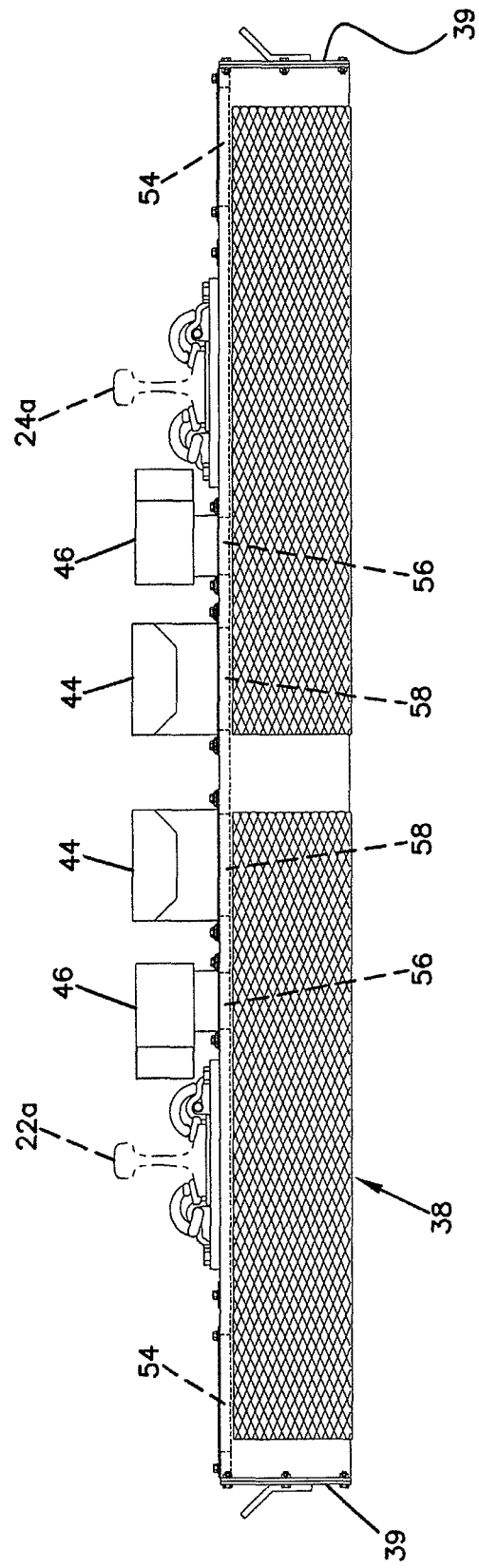
FIG. 3 is a side view of the tie duct of FIG. 2.
Figure 4:
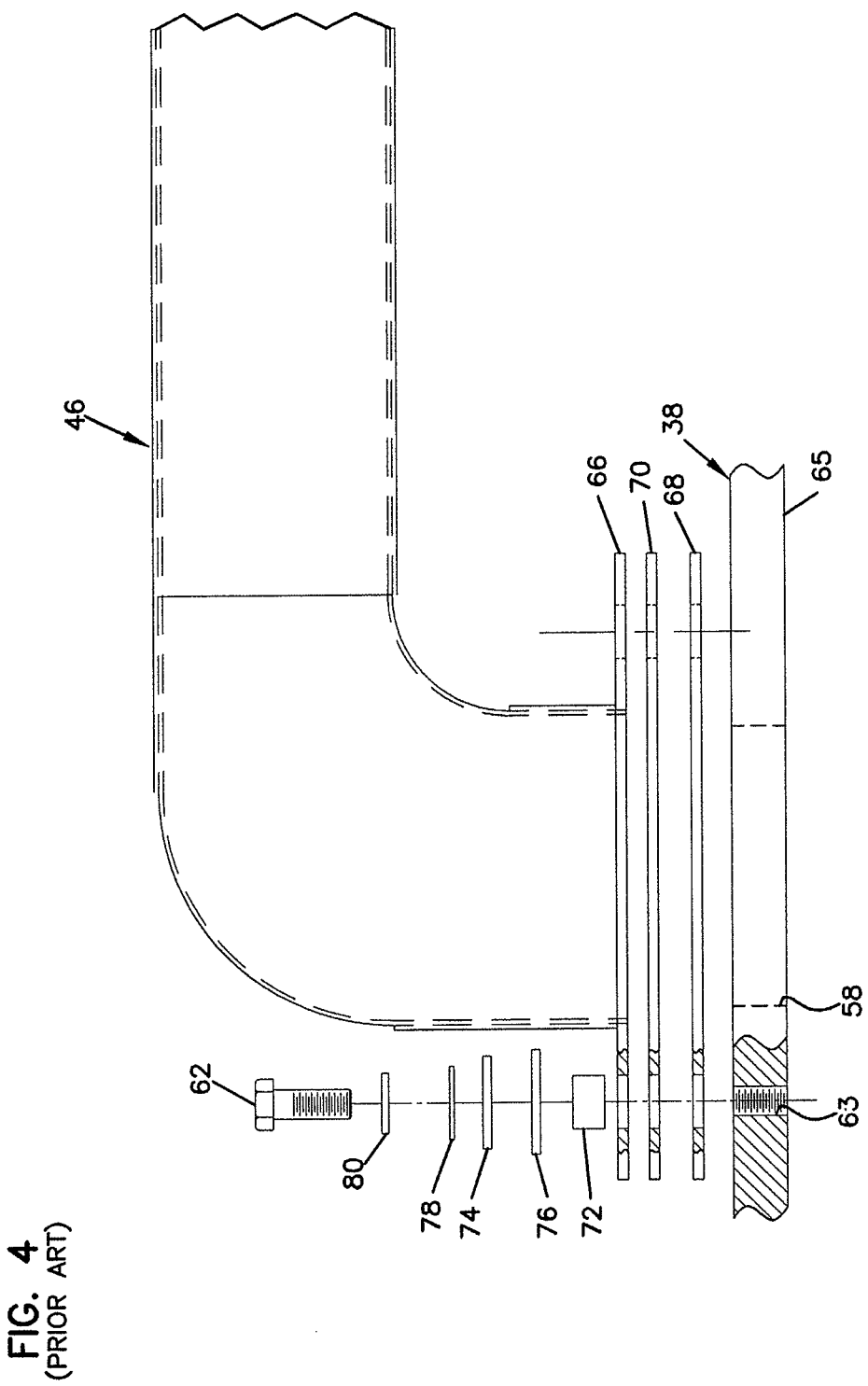
FIG. 4 is an exploded view of one of the point nozzles mounted on the tie duct of FIGS. 2 and 3.
Figure 5:
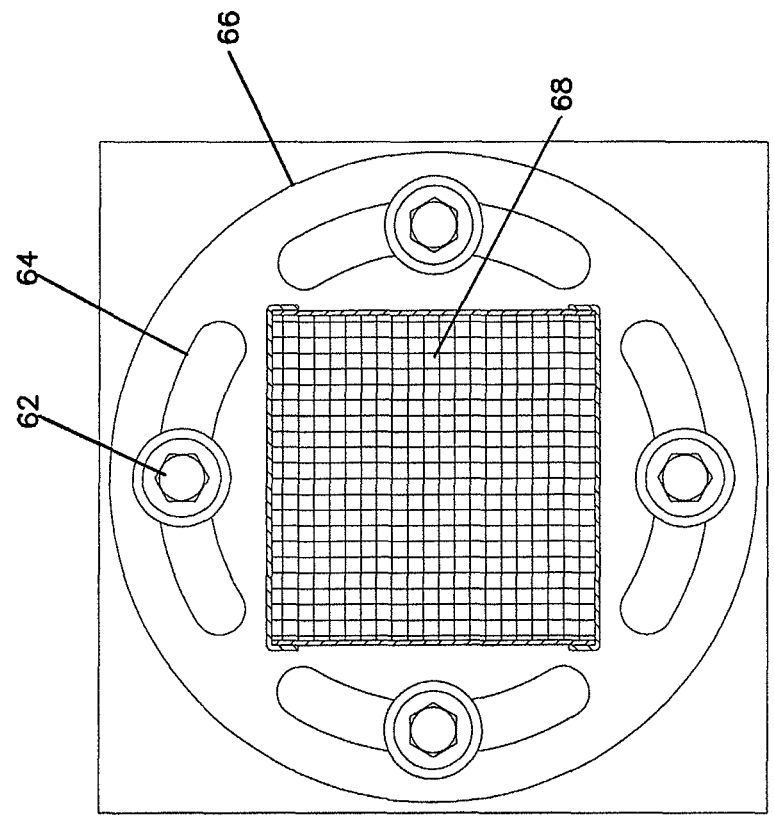
FIG. 5 is a cross-sectional view taken along a section line cut transversely through one of the point nozzles mounted on the track duct of FIGS. 2 and 3.
Figure 6:
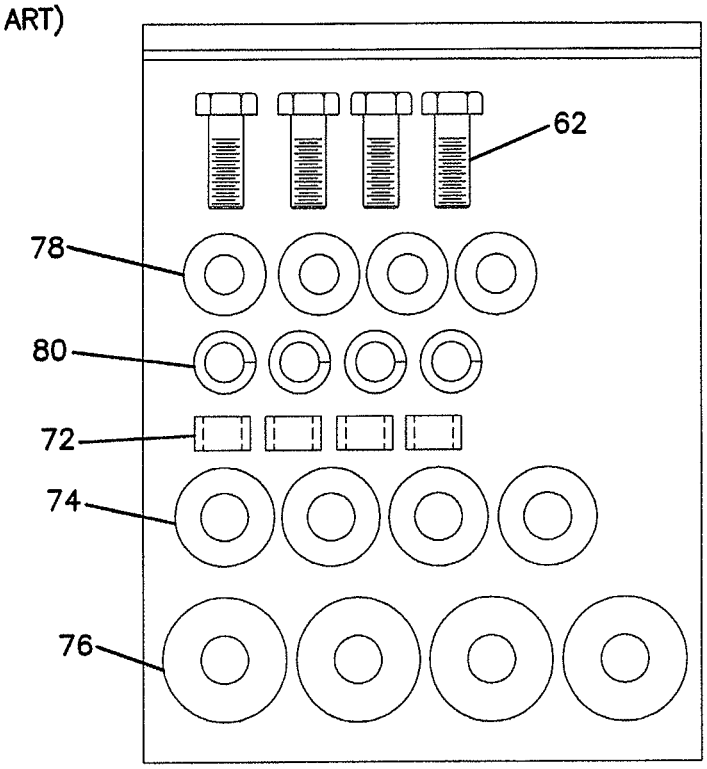
FIG. 6 depicts a bag containing fastening components used to secure the point nozzle of FIG. 4 to the tie duct of FIGS. 2 and 3.
Figure 8:
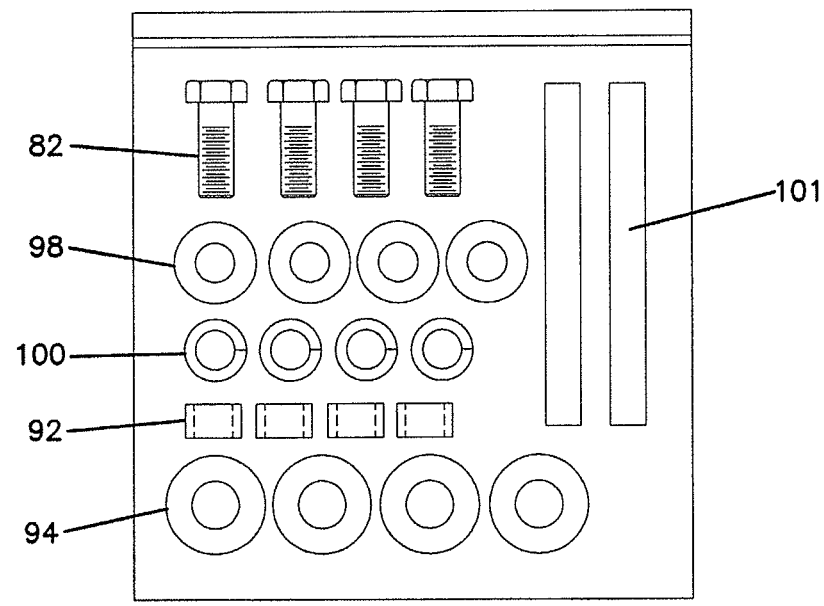
FIG. 8 illustrates a bag containing components used to fasten the track duct nozzle of FIG. 7 to the tie duct of FIGS. 2 and 3.
Figure 7:
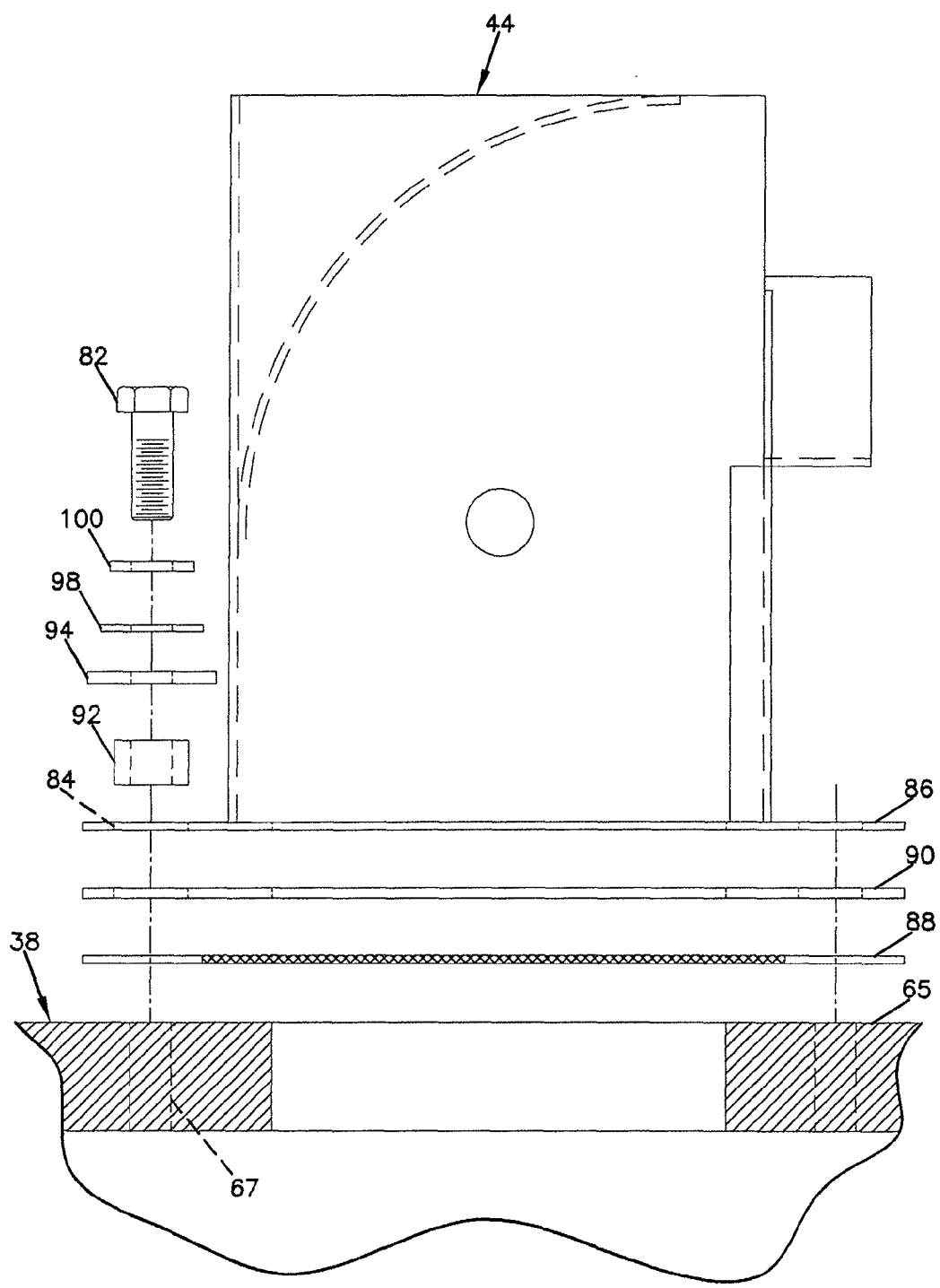
FIG. 7 is an exploded view of one of the track duct nozzles that is mounted to the top side of the tie duct of FIGS. 2 and 3.
Figure 9:
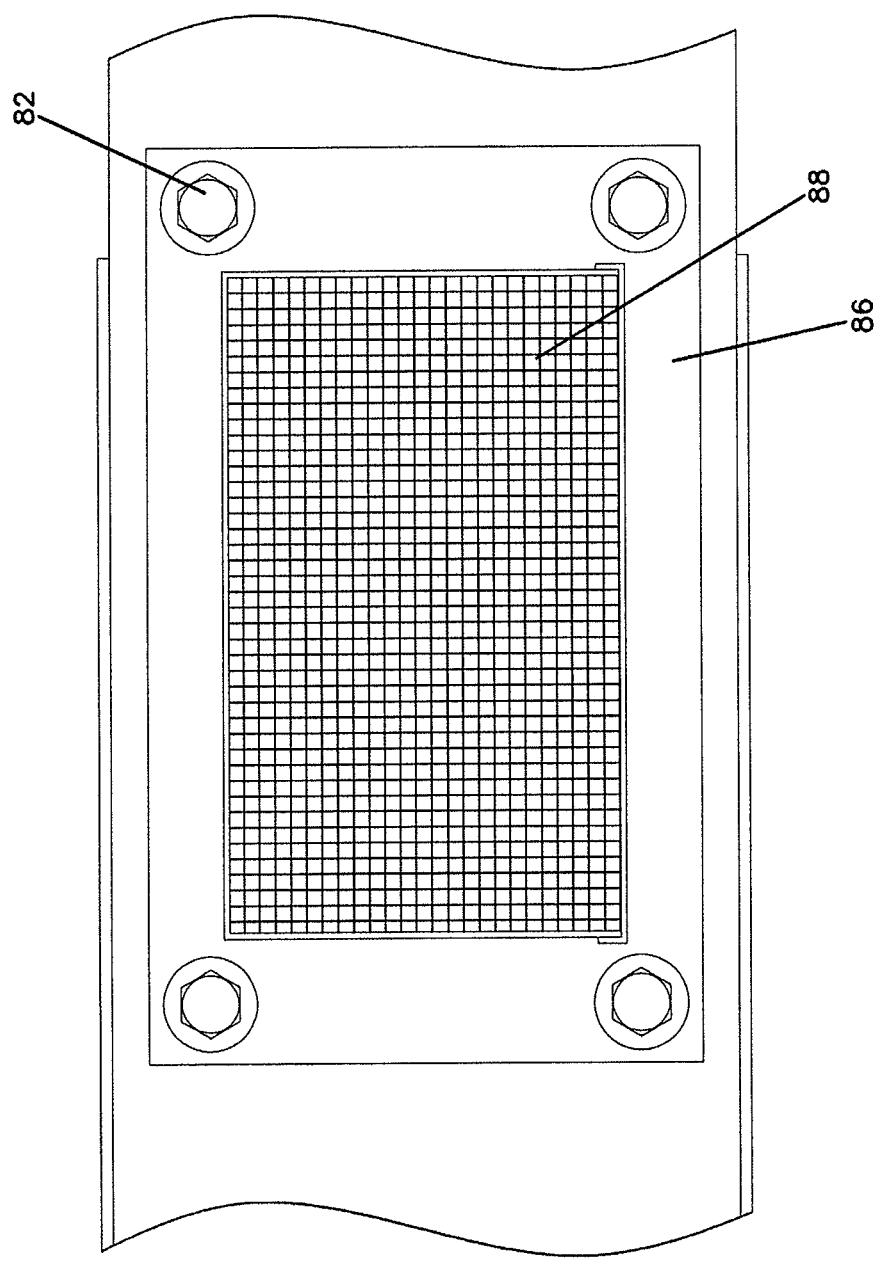
FIG. 9 is a cross-sectional view taken along a section line cut transversely through one of the track duct nozzles mounted on the track duct of FIGS. 2 and 3.

It is often necessary to assemble and disassemble hot air snow melter duct work many times in the field. For example, the duct work is first assembled during initial installation to a tie duct at a switch point. After initial assembly, it is required to periodically tamp the aggregate provided between the railroad ties at the switch point to maintain track integrity. To adequately tamp the aggregate at the switch point, the duct work is typically removed from the tie duct to provide access to the aggregate beneath the duct work. After tamping, the duct work needs to be reassembled. It is also common for duct work to be damaged by passing trains. Each time duct work is substantially damaged, the damaged duct work needs to be disconnected from its corresponding tie duct and replaced with new duct work.

The disassembly and assembly of snow melter duct work typically requires at least a two person crew because one crew member conducts the disassembly and assembly and the other crew member maintains constant lookout for approaching trains. While the crew is working on a section of track, it is necessary for the section of track to be shut down. This interferes with train scheduling and routing.

Conventional fastening assemblies used to secure the point nozzles and the track duct nozzles to a tie duct have many parts that must be handled in the field. Due to the large number of parts that must be handled, the assembly and disassembly of snow melter duct work in the field can be quite time consuming. Time spent on the assembly and disassembly of duct work can amount to significant cost because of the manpower required to conduct the assembly/disassembly and the inconvenience associated with track closures.

One aspect of the present disclosure relates to a system/method for simplifying the assembly and disassembly of hot air snow melter duct work in the field. In one embodiment, at least one nozzle is pre-mounted to an intermediate mounting plate. For example, the nozzle can be mounted to the mounting plate before the nozzle is delivered to the field, or can be mounted to the mounting plate before the section of track at which the nozzle is intended to be installed is shut down for installation of the nozzle. The mounting plate is preferably an intermediate piece (e.g., an adapter) positioned between the nozzle and the tie duct that provides a simple mechanical interface with the tie duct. The mounting plate preferably can be connected to the tie duct and disconnected from the tie duct without disturbing the fixed rails. In one embodiment, the mounting plate is attached to the tie duct at a location between the tie plates that support the rails.

When the nozzle is installed on the tie duct, it is preferred for the nozzle to be electrically isolated from the tie duct. For example, if the mounting plate is constructed of an electrically conductive material, it is preferred that the nozzle be secured to the mounting plate by a fastening arrangement that electrically isolates the nozzle from the mounting plate. By electrically isolating the nozzle from the mounting plate, the nozzle is also electrically isolated from the tie duct. In alternative embodiments, the nozzle can be electrically isolated from the tie duct by using a mounting plate having a dielectric construction.

Figure 10:
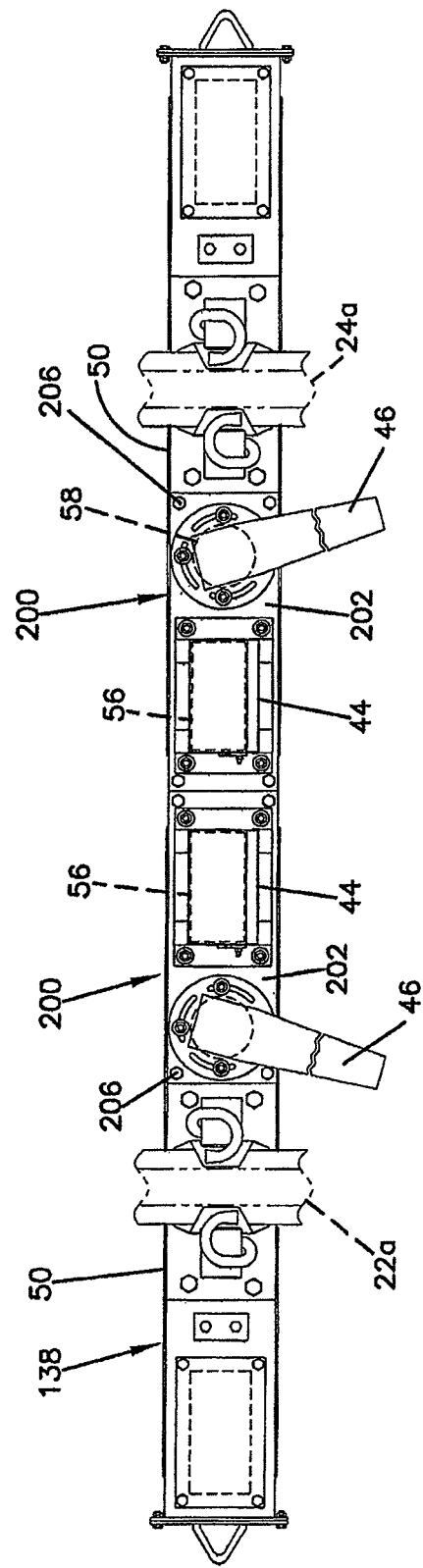
FIG. 10 is a top, plan view of a tie duct having inventive features in accordance with the principles of the present disclosure.
Figure 11:
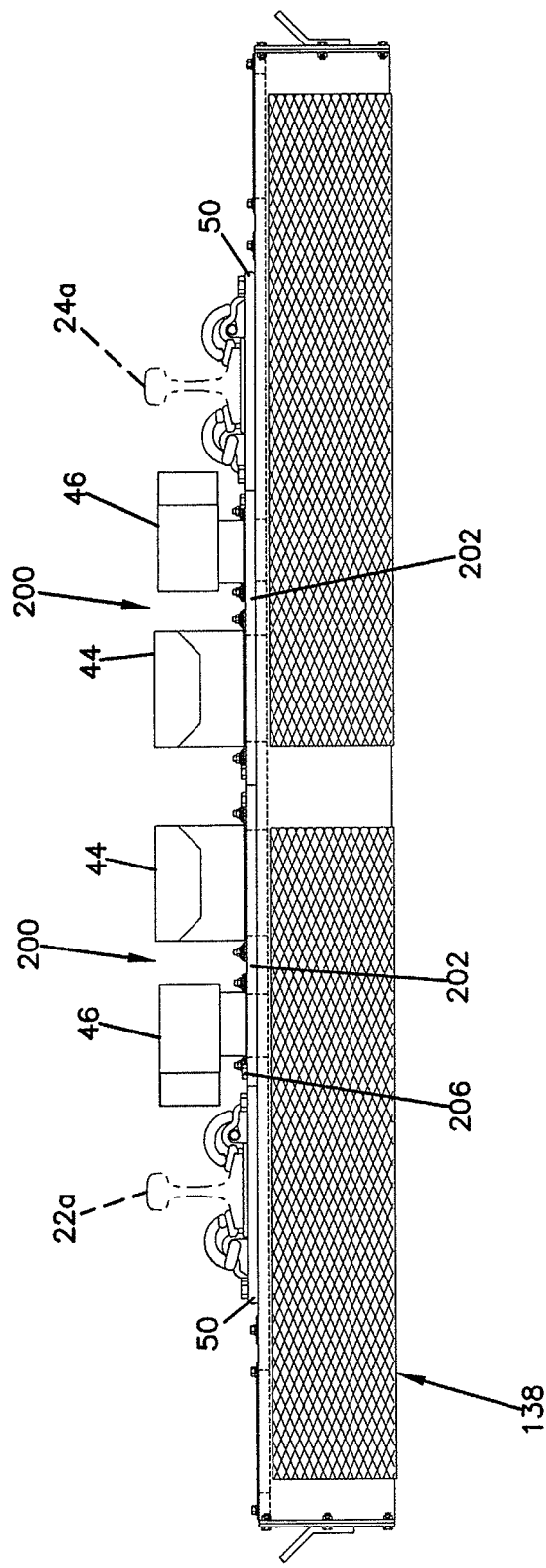
FIG. 11 is a side view of the tie duct of FIG. 10.
Figure 12:
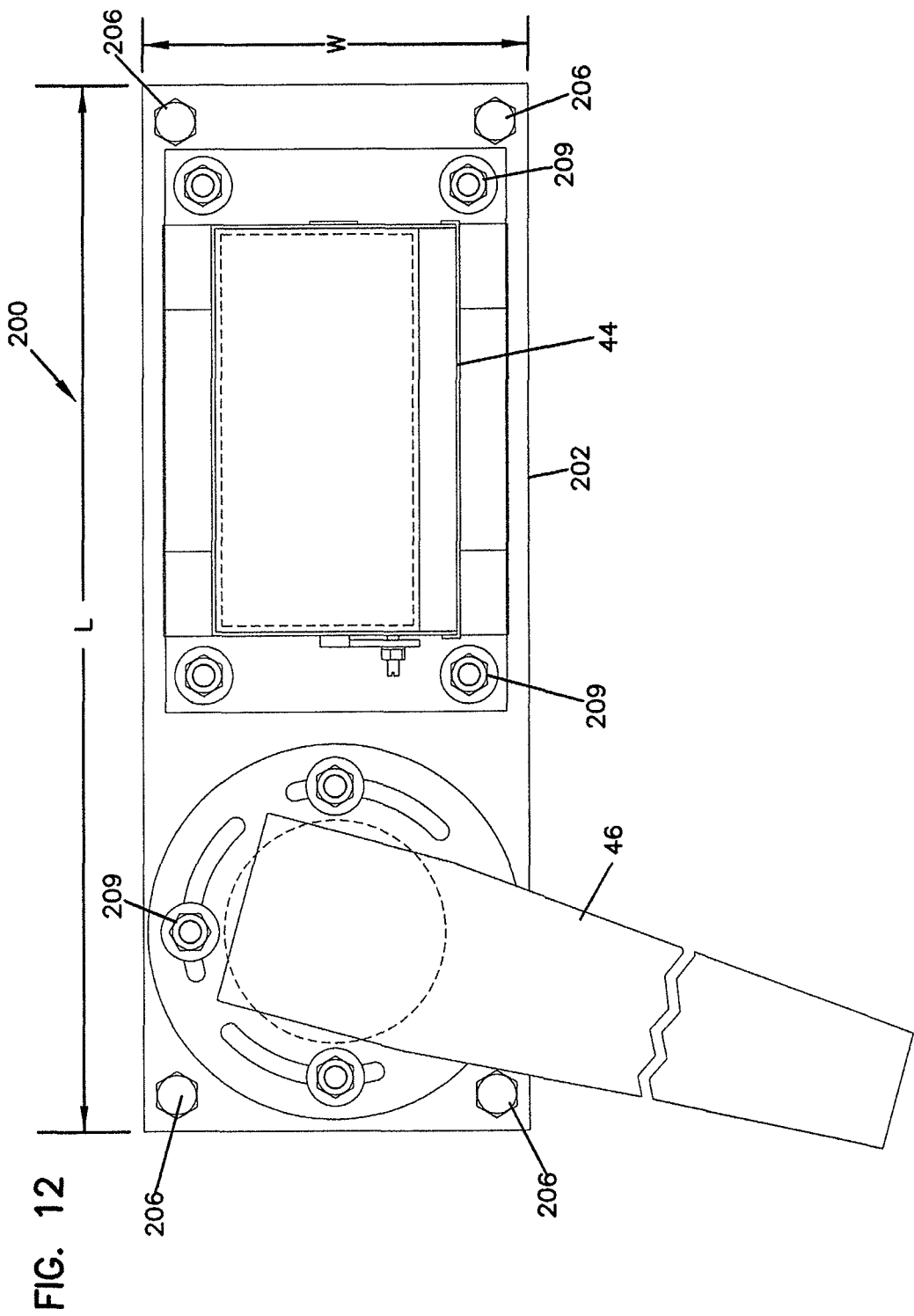
FIG. 12 is a top, plan view of a duct nozzle unit having inventive features in accordance with the principles of the present disclosure.

FIGS. 10 and 11 illustrate an assembly having features that are examples of inventive aspects in accordance with the principles of the present disclosure. The assembly includes a tie duct 138 that can be substituted for the tie duct 38 of FIG. 1. First and second nozzle units 200 are mounted to the top wall of the tie duct 138. Each nozzle unit 200 includes a mounting plate 202 fastened to the top wall of the tie duct 138. Each nozzle unit 200 also includes a point nozzle 46 and track duct nozzle 44 fastened to the mounting plate 202. In this way, the mounting plate 202 forms an intermediate structure positioned between the tie duct 138 and the nozzles 44, 46. The track duct nozzle 44 and the point nozzle 46 are preferably electrically isolated from their corresponding mounting plates 202. In typical embodiments, the mounting plates 202 are not electrically isolated from the tie duct 138. The nozzle units 200 greatly facilitate assembling and disassembling snow melter systems in the field. For example, the nozzle units 200 can be preassembled in the factory prior to being delivered to the field. Therefore, when the nozzle units 200 are delivered to the field, it is not necessary for the field technician to handle all of the fasteners corresponding to each of the separate nozzles 44, 46. Instead, the nozzle units 200 are quickly fastened to the track duct 138 in the field with a relatively small number of fasteners. The nozzle units 200 allow multiple nozzles 44, 46 to be fastened to or unfastened from the tie duct 138 at one time with a reduced number of fasteners, thereby greatly facilitating the assembly/disassembly process.

It is preferred for the mounting plates 202 to be configured for attachment to the top side of the tie duct 138. For example, in one embodiment the mounting plates 202 have a generally flat bottom side adapted to seat on the top side of the tie duct 138. Additionally, each mounting plate 202 includes a plurality of fastener holes 204 (see FIG. 14) adapted to receive fasteners that secure the mounting plates 202 to the top side of the tie duct 138. In the depicted embodiment, each mounting plate 202 includes four fastener holes 204 with each fastener hole being located adjacent to a corner of the mounting plate 202. It will be appreciated that the fasteners used to secure the mounting plates 202 to the tie duct 138 can include bolts 206 that are inserted through the fastener holes 204 and threaded into corresponding tapped openings defined through the top wall of the tie duct 138. Other fasteners could also be used.

In the depicted embodiment, the mounting plates 202 are sized to fit between the fixed rails 22a, 24a of the railway. In this way, the mounting plates 202 can be mounted between the tie plates 50 and can be connected to and disconnected from the tie duct 138 without disturbing the fixed rails supported by the tie plates 50. In one embodiment, each mounting plate 202 can have a width W generally equal to the width of the tie duct 138 (e.g., about 8-10 inches). In some embodiments it is also preferred for the mounting plates 202 to have lengths that are shorter than the distance between the fixed rails 22a, 24a. In the depicted embodiment in which two nozzles are mounted to the mounting plate, it is preferred that each mounting plate has a length less than or equal to about 28.25 inches. In other embodiments, more than two nozzles can be mounted on a mounting plate. For example, in one embodiment, the two inner track duct nozzles and the two point nozzles are all mounted on one mounting plate. For such an embodiment, the mounting plate preferably has a length less than 56.5 inches.

Figure 13:
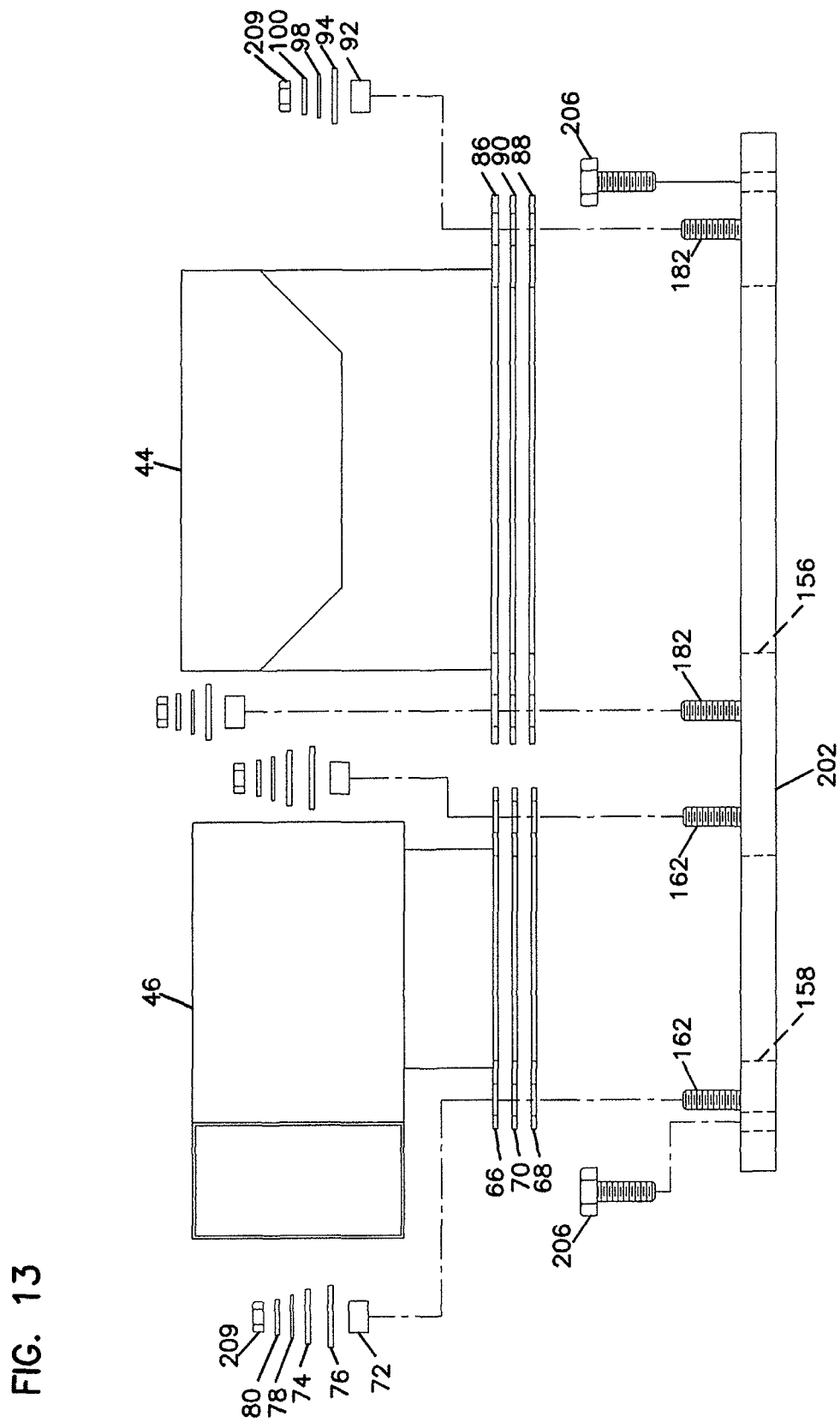
FIG. 13 is an exploded view of the duct nozzle unit of FIG. 12.
Figure 14:
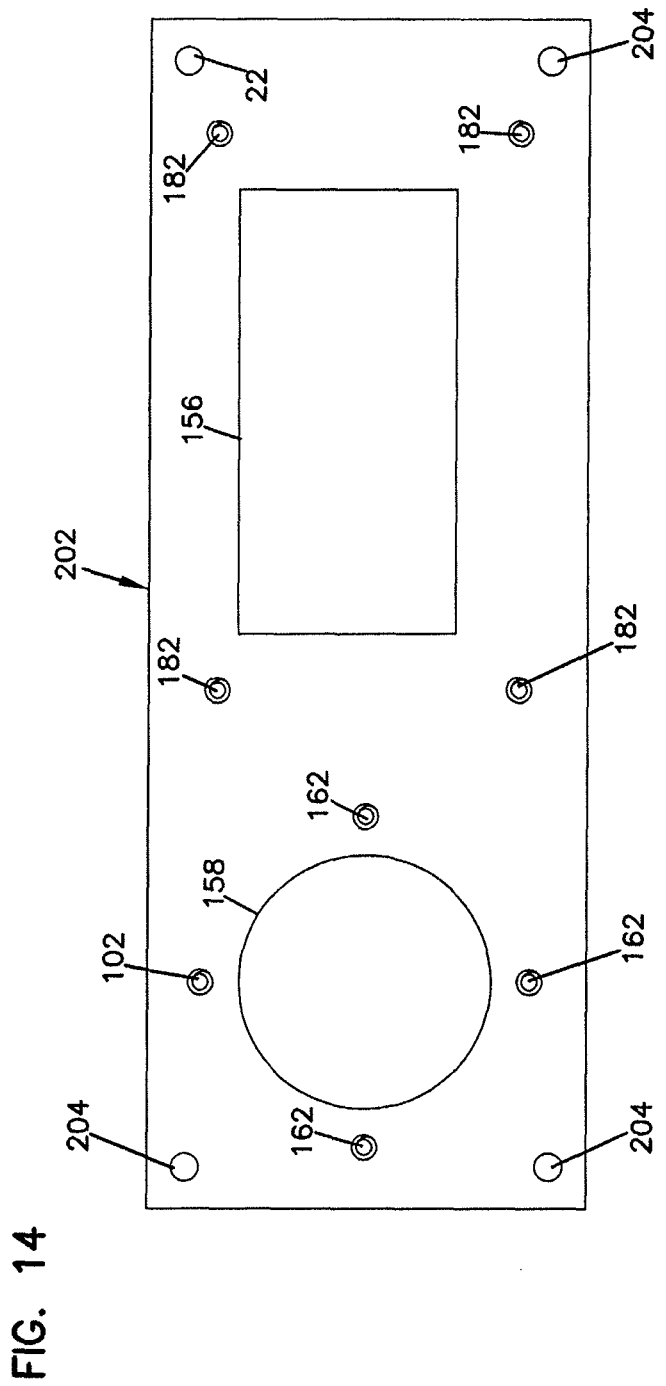
FIG. 14 is a plan view of a plate that is a component of the duct nozzle unit of FIGS. 12 and 13.

As depicted in the example embodiment shown at FIGS. 13 and 14, each mounting plate 202 has a generally flat, rectangular plate construction. In an example embodiment, each plate 202 can be constructed of a metal material such as steel. Each plate 202 preferably defines openings 156, 158 adapted to respectively align with corresponding openings 56, 58 defined through the top wall of the tie duct 138. In this way, the mounting plates 202 do not substantially interfere with the fluid communication provided between the interior of the tie duct 138 and the interiors of the nozzles 44, 46. It will be appreciated that the number of openings provided in the mounting plate and its corresponding tie duct can be varied without departing from the principles of the present disclosure. Similarly, the size and shape of the openings provided in the mounting plate and its corresponding tie duct can be varied without departing from the principles of the present disclosure. Any mounting plate configuration that provides fluid communication between the nozzles and the hollow interior of the tie duct is within the scope of the present disclosure.

Figure 15:
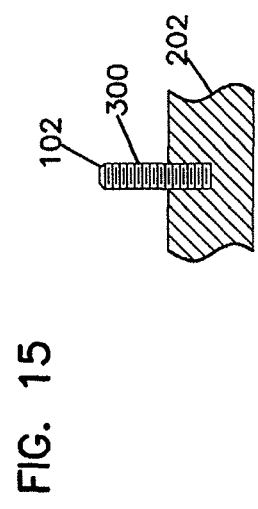
FIG. 15 is a cross-sectional view taken lengthwise through one of the embedded fasteners of the plate of FIG. 14.

Referring again to FIGS. 13 and 14, fasteners 162 are provided for fastening the point nozzle 46 to the mounting plate 202, and fasteners 182 are provided for fastening the track duct nozzle 44 to the mounting plate 202. In the depicted embodiment, each of the fasteners 162, 182 includes a threaded stud 300 that projects upwardly from the top side of the mounting plate 202. In preferred embodiments, the studs 300 do not project below the bottom surface of the mounting plate 202 so as to not interfere with flush mounting of the mounting plates 202 on the tie duct 138. In a preferred embodiment, mounting ends of the studs are fixedly secured (e.g., welded, press fit, or otherwise attached) within vertical openings defined by the mounting plate 202 (see FIG. 15).

For each nozzle unit 200, it is preferred in some embodiments for the point nozzle 46 and the track duct nozzle 44 to be electrically isolated from their corresponding mounting plate 202. As shown at FIG. 13, the point nozzle 46 can be isolated from the mounting plate 202 by a gasket 70, and fasteners 162 are isolated from the point nozzle 46 by dielectric spacers/bushings 72 and by dielectric washers 74. The track duct nozzle 44 is electrically isolated from the mounting plate 202 by a gasket 90. Fasteners 182 are electrically isolated from the track duct nozzle 44 by dielectric spacers/bushings 92 and by dielectric washers 94.

In some embodiments, it is preferred for the track duct nozzle 44 and the point nozzle 46 to be mounted to their corresponding mounting plate 202 prior to delivering the nozzle unit 200 to the field. For example, the nozzle unit 200 can be assembled at the factory. To mount the point nozzle 46 to the mounting plate 202, a screen 68 is positioned over the opening 158 defined through the mounting plate 202. In accordance with the depicted embodiment, the gasket 70 is then positioned on top of the screen 68 and surrounding the opening 158. The point nozzle 46 is then mounted on the plate 202 by positioning the point nozzle 46 such that the fasteners 162 extend through the curved openings 64 defined by the bottom flange 66 of the point nozzle 46. Spacer 72, flat washer 76, dielectric washer 74, flat washer 78 and split lock washer 80 are then consecutively positioned over each of the fasteners 162. Nuts 209 are then threaded on the threaded ends of the fasteners 162 to complete the assembly process.

The track duct nozzle 44 can be secured to the mounting plate 202 in a similar manner. For example, screen 88 is first positioned over opening 156. Next, gasket 90 is positioned over screen 88 and around the opening 156. The track duct nozzle 44 is then positioned on the gasket 90. The track duct nozzle 44 is preferably aligned such that the fasteners 182 extend through the openings 84 defined by the bottom flange 86 of the track duct nozzle 44. Thereafter, the dielectric spacer 92, the dielectric washer 94, the flat washer 98 and the split lock washer 100 are respectively positioned on each of the fasteners 182. The assembly process is completed by threading nuts 209 on the threaded ends of the fasteners 182.

By pre-connecting the track duct nozzle 44 and the point nozzle 46 to the mounting plate 202, the amount of assembly that is required to be completed in the field is substantially reduced. Rather than handling all of the separate fasteners, washers and dielectric elements corresponding to each of the separate nozzles 44, 46, the field technician only handles the reduced number of fasteners used to secure each mounting plate 202 to the tie duct 38. In the depicted embodiment, the field technician need only handle four bolts for each of the nozzle units 200. Of course, the number of attachment fasteners used for each nozzle unit can be varied without departing from the principles of the present invention. By using preassembled sub-assemblies, the various aspects of the present invention allow railway snow melters to be assembled and disassembled more efficiently. The sub-assemblies allow multiple nozzles to be removed or attached to a tie duct at the same time as a unit. This greatly reduces the number of individual parts that need to be handled by the field technician.

In alternative embodiments, the mounting plate of the nozzle unit can have a dielectric construction. For example, the mounting plate may be constructed of a dielectric material such as a plastic material, a composite material or other materials. In still other embodiments, the mounting plate may include an electrically conductive member that is coated or encased within a dielectric outer layer. Such configurations may eliminate the need for using dielectric spacers and dielectric washers in combination with the fasteners that secured the nozzles to the mounting plate.

Figure 16:
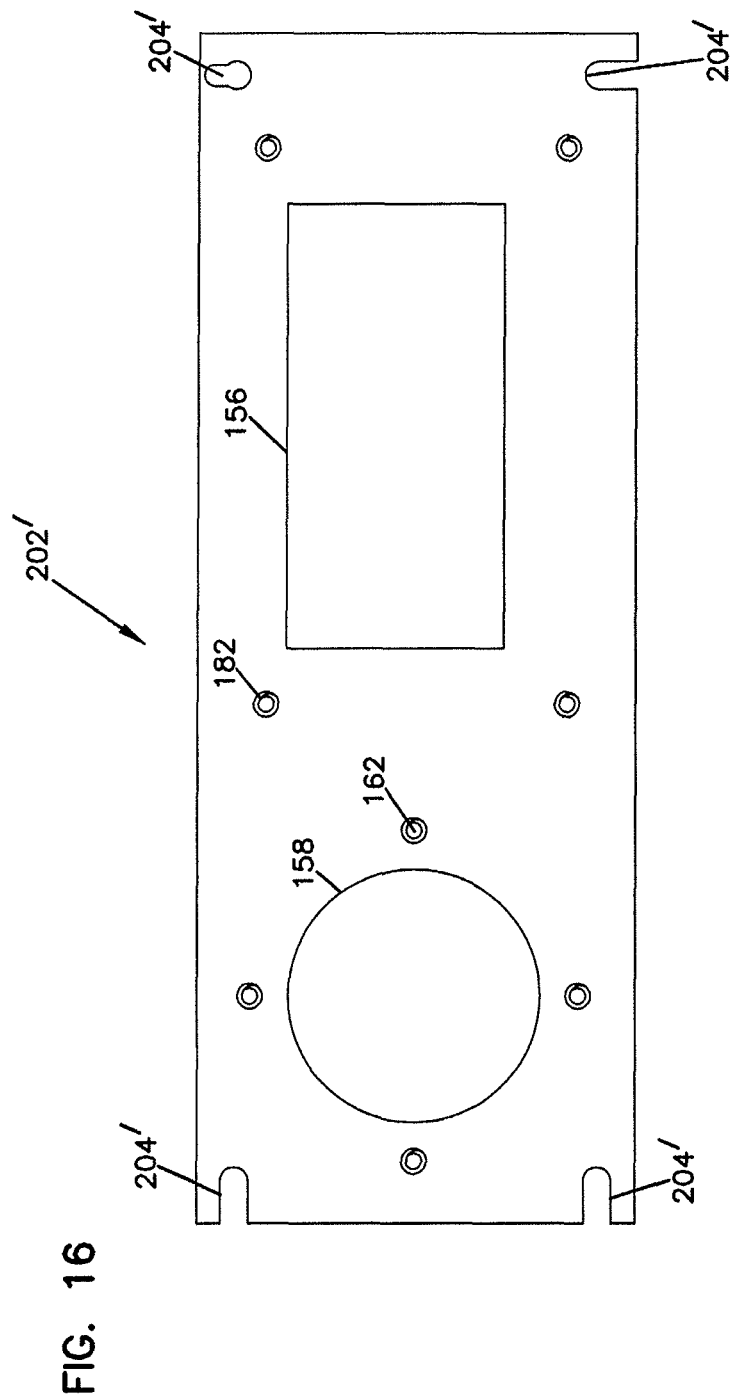
FIG. 16 is a plan view of an alternative mounting plate having features in accordance with the principles of the present disclosure.

FIG. 16 shows another mounting plate 202' in accordance with the principles of the present disclosure. The mounting plate 202' has fastener holes 204' configured to receive fasteners such as bolts that are used to secure the mounting plate 202' to its corresponding tie duct. The holes 204' are configured to allow the mounting plate 202' to be disconnected from its corresponding tie duct by merely loosening the fasteners used to secure the mounting plate 202' to the tie duct. Once the fasteners are loosened, the mounting plate 202' can be manipulated (e.g., pivoted and slid) to disengage the fasteners from the openings. In this way, the fasteners need not be completely disconnected from the tie duct to remove the mounting plate from the tie duct.

The above specification provides examples of how certain inventive aspects may be put into practice. It will be appreciated that the inventive aspects can be practiced in other ways than those specifically shown without departing from the spirit and scope of the inventive aspects.

What is claimed is:

1. A method of directing hot air from a snow melter to rails of a railway line comprising:
    positioning a tie duct under and across a pair of rails of a railway line, the tie duct defining an inner passage configured to direct air flow;
    connecting the tie duct to a blower of the snow melter;
    connecting a preassembled nozzle and mounting plate unit to a top surface of the tie duct between the pair of rails; and
    connecting track ducts to the nozzle.

2. The method of claim 1, wherein the pair of rails are fixed rails and the tie duct is connecting the pair of fixed rails.

3. The method of claim 1, wherein the preassembled nozzle and mounting plate unit includes a plurality of nozzles fixed to a single mounting plate.

* * * * *